US012014893B2

(12) United States Patent
Guo

(10) Patent No.: US 12,014,893 B2
(45) Date of Patent: Jun. 18, 2024

(54) ARC-EXTINGUISHING CIRCUIT WITH TWO POWER SUPPLIES AND APPARATUS

(71) Applicant: Qiaoshi Guo, Guangdong (CN)

(72) Inventor: Qiaoshi Guo, Guangdong (CN)

( * ) Notice: Subject to any disclaimer, the term of this patent is extended or adjusted under 35 U.S.C. 154(b) by 602 days.

(21) Appl. No.: 17/277,753

(22) PCT Filed: Sep. 18, 2019

(86) PCT No.: PCT/CN2019/106451
§ 371 (c)(1),
(2) Date: Mar. 19, 2021

(87) PCT Pub. No.: WO2020/057551
PCT Pub. Date: Mar. 26, 2020

(65) Prior Publication Data
US 2021/0375561 A1 Dec. 2, 2021

(30) Foreign Application Priority Data

Sep. 19, 2018 (CN) .......................... 201811095757.8
Sep. 23, 2018 (CN) .......................... 201811111501.1
(Continued)

(51) Int. Cl.
*H01H 9/30* (2006.01)
*H01H 9/54* (2006.01)
*H02H 9/02* (2006.01)

(52) U.S. Cl.
CPC ................ *H01H 9/30* (2013.01); *H01H 9/54* (2013.01); *H01H 9/542* (2013.01); *H02H 9/02* (2013.01)

(58) Field of Classification Search
CPC ....... H01H 2009/544; H01H 2009/546; H01H 33/596; H01H 9/30; H01H 9/54;
(Continued)

(56) References Cited

U.S. PATENT DOCUMENTS 7,924,535 B2 4/2011 Kao
10,468,207 B2 * 11/2019 Guo ....................... G01R 19/22
(Continued)

FOREIGN PATENT DOCUMENTS

CN 1082247 A 2/1994
CN 2244769 Y 1/1997
(Continued)

OTHER PUBLICATIONS

International Search Report dated Dec. 18, 2019 in connection with International Application No. PCT/CN2019/106451.

*Primary Examiner* — Jared Fureman
*Assistant Examiner* — Nicolas Bellido
(74) *Attorney, Agent, or Firm* — Wolf, Greenfield & Sacks, P.C.

(57) ABSTRACT

The present invention relates to an arc extinguishing circuit and apparatus which are suitable for extinguishing arc of mechanical switches particularly. A mechanical switch requiring arc extinguishing is connected in series with a load, comprising a first switch, a first charging unit and a first capacitor. The first power supply charges the first capacitor by the first charging unit, and the second power supply supplies power to the load by the first switch and the first capacitor during disconnection of the mechanical switch. The first charging unit is either a first element, or a second switch, or comprising a first element and a second switch connected in series. The present invention has the advantages of high capacitance utilization rate of capacitor and simple circuit.

21 Claims, 7 Drawing Sheets

(30) Foreign Application Priority Data

| Date | Country | Number |
|---|---|---|
| Oct. 26, 2018 | (CN) | 201811252682.X |
| Oct. 31, 2018 | (CN) | 201811290483.8 |
| Dec. 8, 2018 | (CN) | 201811499241.X |
| Jan. 8, 2019 | (CN) | 201910017434.5 |
| May 18, 2019 | (CN) | 201910415886.9 |
| May 28, 2019 | (CN) | 201910450041.3 |
| May 28, 2019 | (CN) | 201910453830.2 |
| Jun. 25, 2019 | (CN) | 201910556843.2 |
| Jul. 14, 2019 | (CN) | 201910632857.8 |
| Aug. 4, 2019 | (CN) | 201910714682.5 |
| Sep. 11, 2019 | (CN) | 201910860132.4 |

(58) Field of Classification Search
CPC ........ H01H 9/542; H01H 9/547; H01H 9/548; H02H 3/087; H02H 9/02
See application file for complete search history.

(56) References Cited

U.S. PATENT DOCUMENTS

| | | | |
|---|---|---|---|
| 2003/0086231 A1 | 5/2003 | Asaeda et al. | |
| 2007/0064356 A1 | 3/2007 | Wakatsuki et al. | |
| 2010/0007997 A1 | 1/2010 | Kao | |
| 2012/0125894 A1 | 5/2012 | Heerdt et al. | |
| 2013/0020881 A1 | 1/2013 | Panousis et al. | |
| 2016/0322177 A1* | 11/2016 | Hwang | H01H 33/596 |
| 2016/0322179 A1* | 11/2016 | Hwang | H01H 9/446 |
| 2016/0372278 A1* | 12/2016 | Guo | H03K 17/16 |
| 2019/0035571 A1* | 1/2019 | Guo | H01H 47/24 |
| 2020/0203093 A1* | 6/2020 | Guo | H02H 3/087 |
| 2021/0159031 A1* | 5/2021 | Guo | H01H 9/548 |

FOREIGN PATENT DOCUMENTS

| | | | |
|---|---|---|---|
| CN | 101256907 A | 9/2008 | |
| CN | 102074394 A | 5/2011 | |
| CN | 103325591 A | 9/2013 | |
| CN | 104269835 A | 1/2015 | |
| CN | 104392859 A | 3/2015 | |
| CN | 204242870 U | 4/2015 | |
| CN | 104638633 A | 5/2015 | |
| CN | 204615386 U | 9/2015 | |
| CN | 105185623 A | 12/2015 | |
| CN | 105610301 A | 5/2016 | |
| CN | 105656469 A | 6/2016 | |
| CN | 205407772 U | 7/2016 | |
| CN | 106024455 A | 10/2016 | |
| CN | 106300376 A | 1/2017 | |
| CN | 106783297 A | 5/2017 | |
| CN | 106847581 A | 6/2017 | |
| CN | 206432170 U | 8/2017 | |
| CN | 206471248 U | 9/2017 | |
| CN | 107332222 A | 11/2017 | |
| CN | 207021672 U | 2/2018 | |
| CN | 108879636 A | 11/2018 | |
| CN | 108962647 A | 12/2018 | |
| CN | 109003851 A | 12/2018 | |
| DE | 202017006818 U1 | 7/2018 | |
| JP | H11-69624 A | 3/1999 | |
| JP | 2006-296080 A | 10/2006 | |
| WO | 2017/125056 A1 | 7/2017 | |
| WO | WO-2017125053 A1 * | 7/2017 | ............ H01H 9/00 |
| WO | WO-2017125054 A1 * | 7/2017 | ............ G01R 19/22 |

\* cited by examiner

ARC-EXTINGUISHING CIRCUIT WITH TWO POWER SUPPLIES AND APPARATUS

CROSS-REFERENCE TO RELATED APPLICATIONS

This application is a 35 U.S.C. § 371 National Phase filing of International Application No. PCT/CN2019/106451, filed on Sep. 18, 2019, entitled "ARC-EXTINGUISHING CIRCUIT AND APPARATUS," which claims priority to and the benefit of Chinese Patent Application No. 201910860132.4, filed on Sep. 11, 2019. International Application No. PCT/CN2019/106451 also claims priority to and the benefit of Chinese Patent Application No. 201910714682.5, filed on Aug. 4, 2019. International Application No. PCT/CN2019/106451 also claims priority to and the benefit of Chinese Patent Application No. 201910632857.8, filed on Jul. 14, 2019. International Application No. PCT/CN2019/106451 also claims priority to and the benefit of Chinese Patent Application No. 201910556843.2, filed on Jun. 25, 2019. International Application No. PCT/CN2019/106451 also claims priority to and the benefit of Chinese Patent Application No. 201910453830.2, filed on May 28, 2019. International Application No. PCT/CN2019/106451 also claims priority to and the benefit of Chinese Patent Application No. 201910450041.3, filed on May 28, 2019. International Application No. PCT/CN2019/106451 also claims priority to and the benefit of Chinese Patent Application No. 201910415886.9, filed on May 18, 2019. International Application No. PCT/CN2019/106451 also claims priority to and the benefit of Chinese Patent Application No. 201910017434.5, filed on Jan. 8, 2019. International Application No. PCT/CN2019/106451 also claims priority to and the benefit of Chinese Patent Application No. 201811499241.X, filed on Dec. 8, 2018. International Application No. PCT/CN2019/106451 also claims priority to and the benefit of Chinese Patent Application No. 201811290483.8, filed on Oct. 31, 2018. International Application No. PCT/CN2019/106451 also claims priority to and the benefit of Chinese Patent Application No. 201811252682.X, filed on Oct. 26, 2018. International Application No. PCT/CN2019/106451 also claims priority to and the benefit of Chinese Patent Application No. 201811111501.1, filed on Sep. 23, 2018. International Application No. PCT/CN2019/106451 also claims priority to and the benefit of Chinese Patent Application No. 201811095757.8, filed on Sep. 19, 2018. The entire contents of these applications are incorporated herein by reference in their entirety.

TECHNICAL FIELD

The present invention relates generally to an arc extinguishing circuit and apparatus, and more specifically, to an arc extinguishing circuit and apparatus which are suitable for extinguishing arc of mechanical switches such as contactors (relays), as well as extinguishing arc of other breakpoints, such as fusing of fuse links, breakpoints between plugs and sockets, and breakpoints of wires.

BACKGROUND

Currently, mechanical switches such as contactors (relays) are widely used in various electric control systems such as new energy vehicles, rail transit, ships, etc., to frequently switch on and off the loads. Because of the disconnecting arc of mechanical switch, especially the direct current has no zero point which leads to large disconnecting arc and the shortcoming of short electrical life. As the disconnecting voltage and disconnecting current of mechanical switch increases, the electrical life is greatly reduced.

SUMMARY

One of the objectives of the present invention is to solve the problem of short electrical life of mechanical switches in the existing electric control systems and to provide an arc extinguishing circuit and apparatus with high capacitance utilization rate of capacitor, simple circuit, high arc extinguishing effect and high reliability.

To achieve the objectives of the present invention, one aspect of the present invention presents an arc extinguishing circuit. A mechanical switch requiring arc extinguishing is connected in series with a load to form a first series circuit, wherein the arc extinguishing circuit comprises a first switch, a first charging unit and a first capacitor.

A first power supply charges the first capacitor by the first charging unit, and a second power supply supplies power to the load by the first switch and the first capacitor during disconnection of the mechanical switch;

The first power supply is provided by a power supply connected to the first series circuit.

The working principle is as follows: Before the disconnection of mechanical switch, the first power supply charges the first capacitor by the first charging unit. During the disconnection of the mechanical switch, the second power supply supplies power to the load by the first switch and the first capacitor (i.e., the voltage of the second power supply and the voltage of the first capacitor are added up to provide power to the load) so as to achieve the purpose of arc extinguishing of the mechanical switch.

The present invention is reasonable in design and has the advantages of high capacitance utilization rate of capacitor, simple circuit, high arc extinguishing effect and high reliability.

DETAILED DESCRIPTION OF THE DRAWINGS

Figure 1:
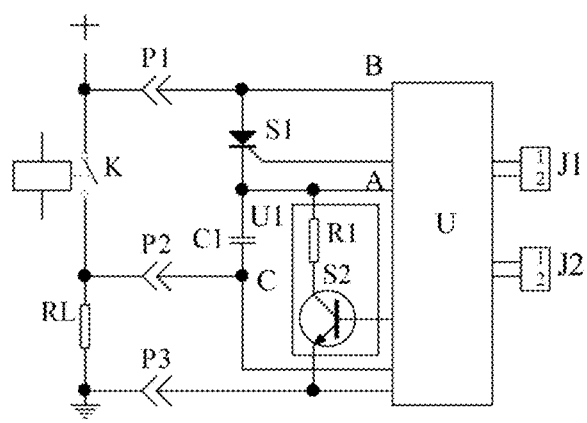
FIG. 1 is a schematic diagram of a circuit of an embodiment of an arc extinguishing circuit and arc extinguishing apparatus according to the present invention.

An embodiment of an arc extinguishing circuit of the present invention is shown in FIG. 1, where a mechanical switch K requiring arc extinguishing is connected in series with a load RL to form a first series circuit, comprising a first switch S1, a first capacitor C1 and a first charging unit U1 (comprising a first element R1 and a second switch S2 connected in series). When the mechanical switch K is closed, the first power supply connected to the first series circuit (is provided by the power supply across the load RL, i.e., by either the output port of the mechanical switch K, or another power supply) charges (i.e. reversely pre-charges) the first capacitor C1 by the first charging unit U1; that is, the series circuit comprising the first capacitor C1 and the first charging unit U1 is connected with the load RL in parallel. During the disconnection of the mechanical switch K, the second power supply (is provided by the power supply connected with the first series circuit, or the input port of the mechanical switch K, or another power supply) supplies power to the load RL by the first switch S1 and the first capacitor C1 (i.e., the series circuit comprises the first switch S1 and the first capacitor C1 is connected with the mechanical switch K in parallel), that is, the power supply at the input port of the mechanical switch K charges the first capacitor C1 in the forward direction by the first switch S1 (the voltage of the second power supply and the voltage of the first capacitor C1 are added up), so as to achieve the purpose of extinguishing arc of the mechanical switch K. When the disconnection of the mechanical switch K is completed, the first capacitor C1 is fully charged in the forward direction, and then the second switch S2 is turned on. The first capacitor C1 is discharged by the first element R1, the second switch S2 and the load RL (or the load RL can be connected in parallel with a diode for bypass discharging) to prepare for the next working process. Note: one of the first element R1 and the second switch S2 of the first charging unit U1 can be selected.

This embodiment has the characteristics of simple circuit and no inrush current when power-on.

Figure 2:
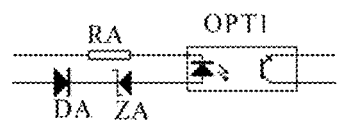
FIG. 2 is a schematic diagram of a circuit of photocoupler voltage detection unit of an arc extinguishing circuit according to the present invention.

An arc extinguishing apparatus comprising foregoing arc extinguishing circuit, further comprising a control unit U, and the control signals of the first switch S1 and the second switch S2 are provided by the control unit U. The voltage signal across the mechanical switch K is transmitted to control unit U (or the signal of the auxiliary switch of mechanical switch K is transmitted to the control unit U). The control unit U is configured to detect the disconnection of the mechanical switch K and detect the charging voltage (voltage of node C) for first capacitor C1. The voltage across the first capacitor C1 can also be provided to the control unit U by a photocoupler voltage detection unit (as shown in FIG. 2) (the photocoupler voltage detection unit can be built-in the control unit U), and the photocoupler voltage detection unit comprising a diode DA, a voltage regulator ZA (equivalent device such as a Zener diode, a varistor, etc.), a photocoupler OPT1 and a resistor RA connected in series. While the operation of arc extinguishing, when the control unit U detects the failure of arc extinguishing (ie., the first switch S1 is turned off, but the second power supply cannot forward charge the first capacitor C1), the control unit U controls the second switch S2 to be turned on and reversely charges the first capacitor C1 rapidly, so as to carry out the secondary arc extinguishing.

Figure 3:
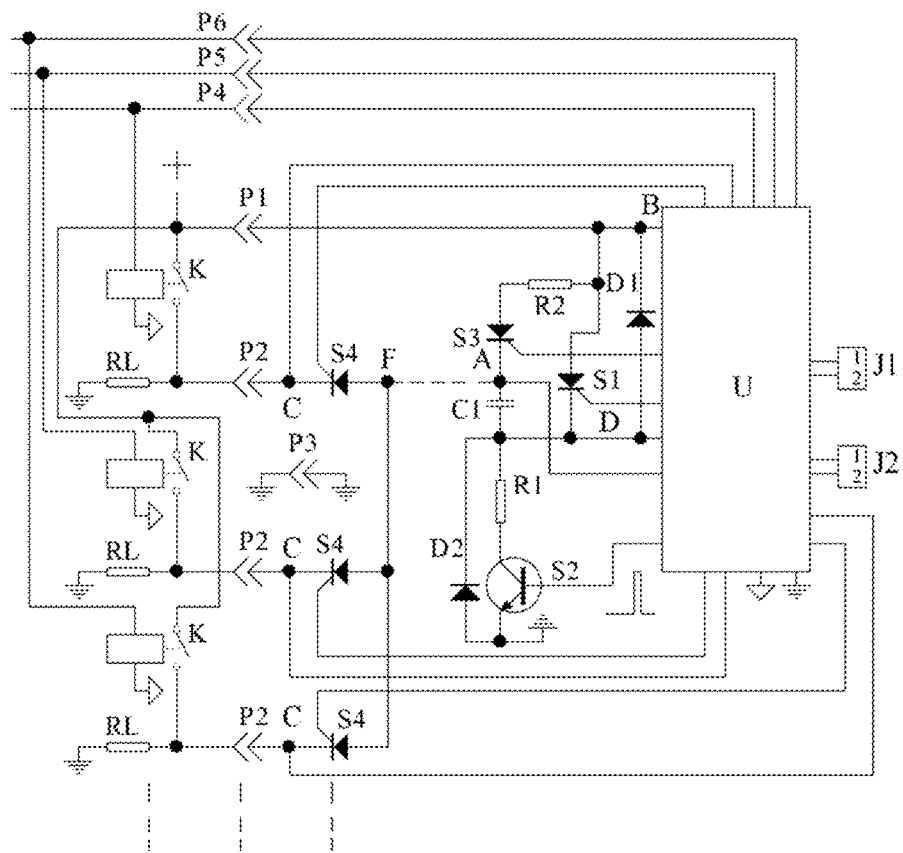
FIG. 3 is schematic diagram 1 of a circuit of an embodiment of an arc extinguishing circuit and arc extinguishing apparatus according to the present invention.
Figure 4:
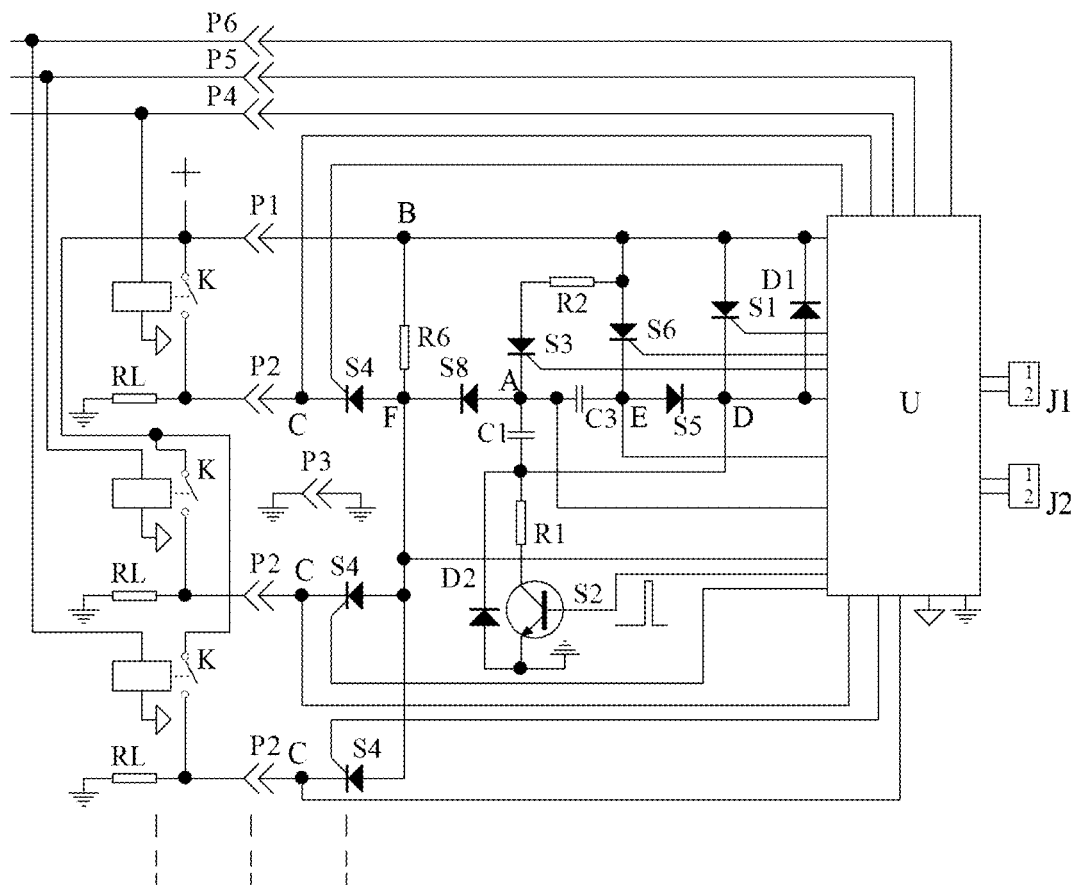
FIG. 4 is schematic diagram 2 of a circuit of an embodiment of an arc extinguishing circuit and arc extinguishing apparatus according to the present invention.

An embodiment of an arc extinguishing circuit and arc extinguishing apparatus of the present invention is shown in FIG. 3 and FIG. 4, where a mechanical switch K requiring arc extinguishing is connected in series with a load RL to form a first series circuit, comprising a first switch S1, a second switch S2, a third switch S3, a fourth switch S4, a first capacitor C1, a first element R1, a first diode D1 (configured to discharge the first capacitor C1), a second diode D2 and a second element R2. The first element R1 and the second switch S2 connected in series to form a first charging unit of the first capacitor C1. The second element R2 (optional), the third switch S3, the first capacitor C1, the first element R1 (optional) and the second switch S2 form a third series circuit. The first power supply (provided by either the power supply connected to two ends of the first series circuit, or the input port of the mechanical switch K, or another power supply) connected with the first series circuit is connected with the third series circuit, and the third series circuit is configured to charge (i.e. reversely pre-charging) the first capacitor C1. The first switch S1, the first capacitor C1 and the fourth switch S4 form a second series circuit. During the disconnection of mechanical switch K, the second power supply (provided by either the power supply connected at two ends of the first series circuit, or the input port of the mechanical switch K, or another power supply) supplies power to the load RL by the second series circuit (the voltage of the second power supply and the voltage of the first capacitor C1 are adding up), so as to achieve the purpose of arc extinguishing of mechanical switch K. Further comprising a sixth element R6 and an eighth switch S8; the technical scheme that the voltage signal (can be either a common node-to-ground voltage signal, or the voltage between the common node and the power supply connected to the sixth element R6) at the common node of the eighth switch S8 and the fourth switch S4 is transmitted to the control unit U can be configured to detect the working states (off, on, breakdown) of the fourth switch S4 and the third switch S3.

When the disconnection of mechanical switch K is completed, the first capacitor C1 is fully charged in the forward direction and the third switch S3 is turned on. The first capacitor C1 is discharged by the first diode D1, the second element R2 and the third switch S3 (note: the circuit can also be changed such that one port of the first diode D1 is grounded, and the other port of the first diode D1 is connected to the first capacitor C1, i.e., the node A is connected. The first capacitor C1 is discharged by the first element R1, the second switch S2 and the first diode D1.) and prepare for the next working process. The second element R2 (optional), the third switch S3 and the fourth switch S4 form a fourth series circuit. Before or when the closing of the mechanical switch K, the second power supply supplies power to the load RL by the fourth series circuit and it's configured to either close and arc extinguishing of mechanical switch K, or pre-charge the load RL (capacitive load, motor controller, DC converter, etc.), thus the current impact of capacitive load on the mechanical switch K can be effectively overcome. Note: when the closing of the mechanical switch K, if the first switch S1 is also turned on, the arc extinguishing effect on the closing and bouncing of the mechanical switch K is improved because the third switch S3 provides a discharge loop for the first capacitor C1, meanwhile, the third switch S3 keeps supplying power to the load RL, and the first capacitor C1 also supplies power to the load RL.

The second diode D2 is configured to ground the first capacitor C1, which is convenient for the control unit U to sample the voltage at node A, and is selected as required (can be omitted if the second switch S2 has a built-in diode). When the first power supply is not supplied by the power supply connected by the first series circuit and is input by node A, the second element R2 and the third switch S3 are selected as required.

The circuit of FIG. 4 based on FIG. 3 adds a sixth switch S6, a third capacitor C3, a fifth switch S5 (a diode is preferred; or a controllable switch whose control signal is provided by the control unit, such as a unidirectional thyristor), an eighth switch S8 (a diode is preferred; or a controllable switch whose control signal is provided by the control unit, such as a unidirectional thyristor) and a sixth element R6 (a resistor). The second element R2 (optional), the third switch S3, the third capacitor C3, the fifth switch S5, the first element R1 (optional) and the second switch S2 form a fifth series circuit, which is configured to charge the third capacitor C3. The sixth switch S6, the third capacitor C3, the eighth switch S8 (optional) and the fourth switch S4 form the sixth series circuit. During the disconnection of the mechanical switch K, the second power supply supplies power to the load RL by the sixth series circuit. During the disconnection of the mechanical switch K, there're two control modes of arc extinguishing. One is the first capacitor C1 and the third capacitor C3 are configured to simultaneously supply power to the load RL (for improving the reliability of arc extinguishing of a mechanical switch K connected with a large current load). The other is the first capacitor C1 and the third capacitor C3 successively supply power to the load RL to extinguish the arc of either the same mechanical switch K (the reliability of arc extinguishing of mechanical switch K is improved to prevent arc reignition, which is especially suitable for arc extinguishing of mechanical switch which have no working current disconnecting ability.) or different mechanical switch K to greatly improve the response speed of secondary arc extinguishing. The discharge operation process of the third capacitor C3 can refer to that of the previous first capacitor C1. The discharge circuit of the third capacitor C3 shares the discharge circuit of the first capacitor C1, and the charge circuit of the third capacitor C3 shares the charge circuit of the first capacitor C1. This can greatly simplify the circuit, reduce the cost and reduce the volume.

A power supply (can be either the power supply at the input port of the mechanical switch K, or provided by another power supply) is connected to the common node of the eighth switch S8 and the fourth switch S4 by the sixth element R6 (the resistance of which satisfies that the current through the sixth element R6 is less than the minimum holding current of the fourth switch S4). The series circuit comprising the first capacitor C1 and the eighth switch S8 is connected to the fourth switch S4, which is advantageous for the control unit U to quickly detect whether the fourth switch S4 breaks down according to the voltage at the common node after the first capacitor C1 supplies power to the load RL or before charging the first capacitor C1, so as to prevent the third switch S3 from being unable to turn off when charging the first capacitor C1. It is also possible to connect a photocoupler (defined as a second photocoupler to detect the voltage between the common node and the power supply connected to the sixth element R6) in series with the sixth element R6, and the output signal of the photocoupler is transmitted to the control unit U to detect whether the fourth switch S4 breaks down.

An embodiment of an arc extinguishing apparatus of the present invention is an arc extinguishing apparatus comprising foregoing arc extinguishing circuit embodiment 2;

An arc extinguishing apparatus suitable for electric control systems of single or multiplex mechanical switches such as new energy vehicles, rail transit, aviation, automatic control and the like (i.e., an intelligent management system of mechanical switch), further comprising a control unit U, and the control signals for the first switch S1, the second switch S2, the third switch S3, the fourth switch S4 and the sixth switch S6 (shown as FIG. 4 and it's optional) are provided by the control unit U. The voltage signal of the first capacitor C1 is transmitted to the control unit U for detecting the working states (breakdown, on, off) of the first switch S1, the second switch S2, the third switch S3 and the fourth switch S4. The voltage signal of the first capacitor C1 can be either a voltage signal across the first capacitor C1, or a voltage signal between two ends of the first capacitor C1 and ground respectively. The voltage signal of the power supply at the input port of the mechanical switch K (via node B) and the voltage signal at the common node of the mechanical switch K and the load RL (via node C) are transmitted to the control unit U.

Working principle: After the input port of the mechanical switch K is powered on, the control unit U provides a control signal to the second switch S2 (configured to control conduction) and a pulse signal to trigger the third switch S3 to turn on so as to charge the first capacitor C1. When the whole charging operation of the first capacitor C1, the control unit U adjusts the charging voltage for the first capacitor C1 by detecting the voltage of node A and further knows the capacitance of the first capacitor C1 (configured to judge whether the capacitance of the first capacitor C1 is within the normal value or not, and optimize the arc extinguishing control program according to the collected data). And by detecting the charging voltage for the first capacitor C1, it can be known whether the fourth switch S4 is breakdown (If there is a breakdown condition, the control unit U will not perform turn-on control on the other fourth switch S4. A detection unit for detecting the charging current of the first capacitor C1 can also be added, and the output signal of the detection unit is transmitted to the control unit U for detecting whether the fourth switch S4 breaks down or not.). During the closing of the mechanical switch K, the control unit U provides a pulse signal to trigger the third switch S3 and the fourth switch S4 to turn on (it's optional according to requirement). The control unit U knows whether the third switch S3 and the fourth switch S4 are turned off or not by detecting the voltage at the node A (i.e., the common node of the third switch S3 and the fourth switch S4). If it is off, it means that the mechanical switch K is closed (or the capacitive load is fully charged).

During the disconnection of the mechanical switch K, the third switch S3 is in the off state (or can be in the on state if the third switch S3 adopts a full-controlled device), and the control unit U detects that the contacts of the mechanical switch K are open (the disconnection of the contacts of the mechanical switch K can be detected by either detecting the voltage at the common node of the mechanical switch K and the load RL, or by an auxiliary switch of the mechanical switch K). Then, the first switch S1 (or the sixth switch S6) and the fourth switch S4 are controlled to be turned on. The built-in microcontroller can complete delay (optional) control the first switch S1 (or the sixth switch S6) and the fourth switch S4 to be turned on. The time value of delay is related to the disconnection speed of the corresponding mechanical switch K. When there is a certain distance between the contacts of the mechanical switch K, the first capacitor C1 starts to discharge (preventing the pre-charge voltage of the first capacitor C1 from forming a loop by the mechanical switch K), the voltage across the load RL rises, and the electric field strength between the contacts of the mechanical switch K rapidly decreases, thus achieving the purpose of rapidly extinguishing the arc of the mechanical switch K. The control unit U knows the working states (on or off) of the first switch S1 and the fourth switch S4 by detecting the voltage at the node A(F) (i.e., the common node of the series circuit formed by the first switch S1 and the first capacitor C1 and the fourth switch S4, or the node D), so as to judge whether the first capacitor C1 completes forward charging and prepare for discharging the first capacitor C1.

In this embodiment, both the first power supply and the second power supply are provided by two ends of the first series circuit, which has the advantages of simple circuit and high cost performance.

In the foregoing embodiment, the arc extinguishing voltage improvement can be realized under the condition that without a transformer, a single capacitor and the charging voltage for the capacitor are not greater than the system working voltage, and has the advantages of simple circuit, small volume and high reliability.

Figure 5:
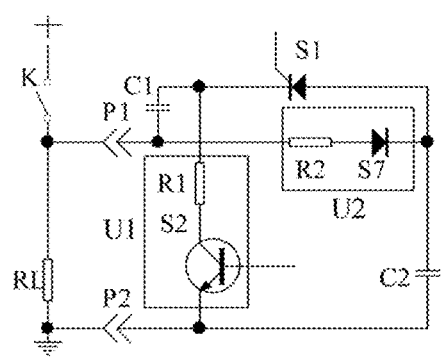
FIG. 5 is schematic diagram 1 of a circuit of an embodiment of an arc extinguishing circuit according to the present invention.

The circuit diagram 1 of an embodiment of an arc extinguishing circuit of the present invention is shown in FIG. 5, where a mechanical switch K requiring arc extinguishing is connected in series with a load RL to form a first series circuit, comprising a first switch S1, a first capacitor C1, a first charging unit U1 (comprising a first element R1 and a second switch S2 connected in series), a second capacitor C2 and a second charging unit U2 (comprising a second element R2 and a seventh switch S7 connected in series).

When the mechanical switch K is closed, the first power supply connected to the first series circuit (is provided by the power supply across the load RL, i.e., by either the output port of the mechanical switch K, or another power supply) charges the first capacitor C1 by the first charging unit U1. Meanwhile, the first power supply charges the second capacitor C2 by the second charging unit U2. During the disconnection of the mechanical switch K, the second power supply (which is provided by the second capacitor C2) supplies power to the load RL by the first switch S1 and the first capacitor C1 (the voltage of the second power supply and the voltage of the first capacitor C1 are added up), so as to achieve the purpose of extinguishing arc of the mechanical switch K. Note: one of the first element R1 and the second switch S2 of the first charging unit U1 can be selected. One of the second element R2 and the seventh switch S7 (either a unidirectional thyristor or a diode) of the second charging unit U2 can be selected. If the second capacitor C2 is charged, the second charging unit U2 can be omitted.

This embodiment has the advantages of simple circuit, high cost performance and safety.

Figure 6:
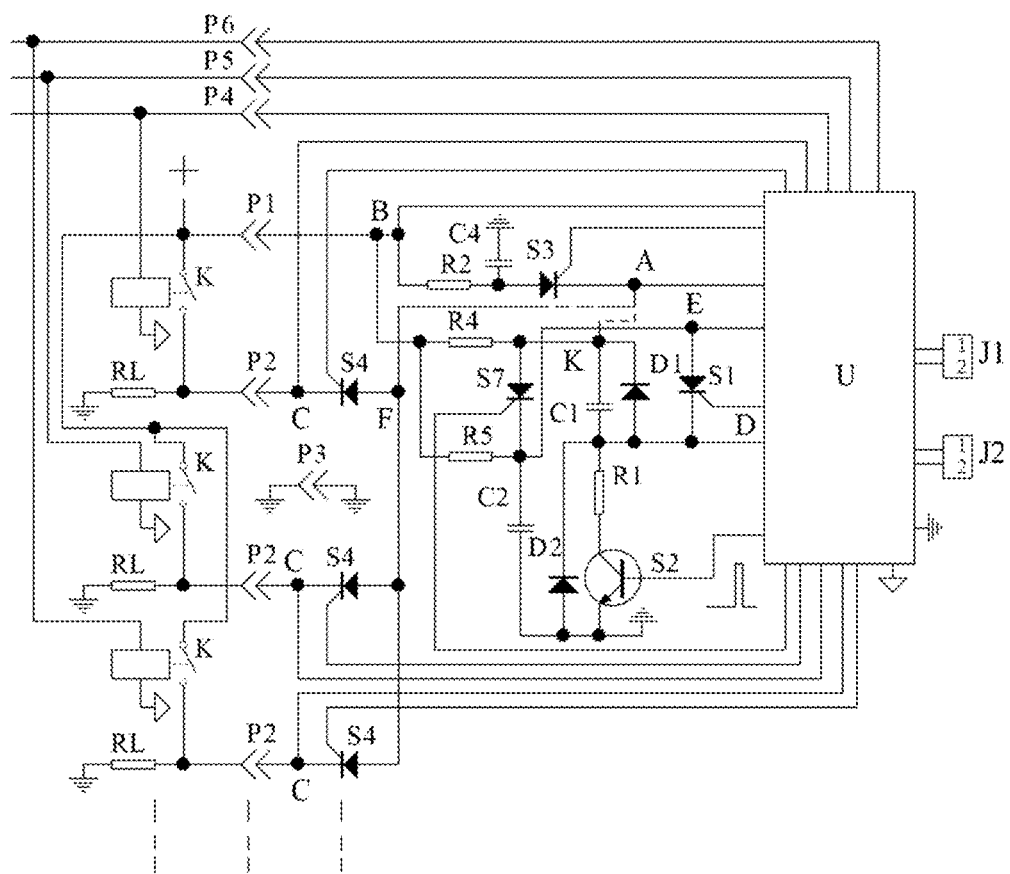
FIG. 6 is both schematic diagram 2 of a circuit of an embodiment of an arc extinguishing circuit according to the present invention and a schematic diagram of a circuit of an embodiment of an arc extinguishing apparatus according to the present invention.

The circuit schematic diagram 2 of an embodiment of the arc extinguishing circuit and the circuit schematic diagram of an embodiment of an arc extinguishing apparatus of the present invention is shown in FIG. 6.

An arc extinguishing circuit, FIG. 6 shows the addition of a third switch S3, a fourth switch S4, a fourth capacitor C4, a first diode D1, a second diode D2, a fourth element R4 (a resistor), and a fifth element R5 (a resistor) to FIG. 5. The second element R2 (optional), the third switch S3 (optional), the first capacitor C1, the first element R1 (optional) and the second switch S2 form a third series circuit for charging the first capacitor C1. The first power supply connected to the first series circuit (provided by the power supply connected to two ends of the first series circuit or provided by another power supply) charges the first capacitor C1 by the third series circuit, while the first power supply charges the second capacitor C2 by the second element R2, the third switch S3, and the seventh switch S7 (a unidirectional thyristor, which can also be formed by a diode and a resistor connected in series). And the first switch S1, the first capacitor C1 and the fourth switch S4 form a second series circuit. During the disconnection of the mechanical switch K, the second power supply provided by the second capacitor C2 supplies power to the load RL by the second series circuit, so as to achieve the purpose of extinguishing arc of the mechanical switch K. If the charge of the first capacitor C1 is less than that of the second capacitor C2, the second capacitor C2 is discharged by the first switch S1, the first diode D1, the fourth switch S4 and the load RL after the first capacitor C1 is discharged. If the charge of the first capacitor C1 is greater than that of the second capacitor C2, the first capacitor C1 is discharged by the fourth switch S4, the load RL, and the second diode D2 after the second capacitor C2 is discharged.

The second element R2 (optional), the third switch S3 and the fourth switch S4 form a fourth series circuit. Before the mechanical switch K is closed or during the closing of the mechanical switch K, the first power supply supplies power to the load RL by the fourth series circuit and is configured to close and extinguish arc of the mechanical switch K. Or for pre-charging the load RL (capacitive load, motor controller, DC converter, etc.), which can effectively overcome the current impact of capacitive load on the mechanical switch K. Note: Before the mechanical switch K is closed, the first capacitor C1 cannot be charged and only the second capacitor C2 can be charged. During the closing of the mechanical switch K, if the first switch S1 and the seventh switch S7 are also turned on, the bouncing arc extinguishing effect on the closing of the mechanical switch K is better, because the second capacitor C2 simultaneously keeps supplying power to the load RL, and the third switch S3 simultaneously supplements the charging of the second capacitor C2.

Note: If the first power supply is not provided by the power supply connected by the first series circuit and is input by the node A, the second element R2 and the third switch S3 are selected as required.

An embodiment of an arc extinguishing apparatus of the present invention, comprising an embodiment of an arc extinguishing circuit, which is an arc extinguishing apparatus (i.e., a mechanical switch intelligent management system) suitable for single or multiplex mechanical switch electric control systems such as new energy vehicles, rail transit, aviation, automatic control, etc. and further comprises a control unit U. The control signals for the first switch S1, the second switch S2, the third switch S3, the fourth switch S4 and the seventh switch S7 are provided by the control unit U. The voltage signal of the first capacitor C1 is transmitted to the control unit U for detecting the working states (breakdown, on or off) of the first switch S1, the second switch S2, the third switch S3 and the fourth switch S4. The voltage signal of the first capacitor C1 can be a voltage signal across the first capacitor C1, or a voltage signal between two ends of the first capacitor C1 and ground respectively. The voltage of the second capacitor C2 is transmitted to the control unit U. The voltage signal of the power supply at the input port of the mechanical switch K (via node B) is transmitted to the control unit U.

Working principle: After the input port of the mechanical switch K is powered on, the control unit U provides a control signal to the second switch S2 (configured to control conduction) and a pulse signal to trigger the third switch S3 and the seventh switch S7 to turn on so as to charge the first capacitor C1 and the second capacitor C2. When the whole charging operation of the first capacitor C1, the control unit U adjusts the charging voltage for the first capacitor C1 by detecting the voltage of node A and further know the capacitance of the first capacitor C1 (configured to judge whether the capacitance of the first capacitor C1 is within the normal value or not, and optimizing the arc extinguishing control program according to the collected data). And by detecting the charging voltage for the first capacitor C1, it can be known whether the fourth switch S4 is breakdown (If there is a breakdown condition, the control unit U will not perform conduction control on the other fourth switch S4; A detection unit for detecting the charging current of the first capacitor C1 can also be added, and the output signal of the detection unit is transmitted to the control unit U for detecting whether the fourth switch S4 breaks down or not.). The control unit U knows the capacitance of the second capacitor C2 (configured to judge whether the capacitance of the second capacitor C2 is within the normal value or not, and optimizing the arc extinguishing control program according to the collected data) by detecting the voltage of node E. And by detecting the charging voltage for the second capacitor C2, it can be known whether the fourth switch S4 is breakdown (If there is a breakdown condition, the control unit U will not perform conduction control on the other fourth switch S4; A detection unit for detecting the charging current of the second capacitor C2 can also be added, and the output signal of the detection unit is transmitted to the control unit U for detecting whether the fourth switch S4 breaks down or not.). During the closing of the mechanical switch K, the control unit U provides a pulse signal to trigger the third switch S3 and the fourth switch S4 to turn on (it's optional according to requirement). The control unit U knows whether the third switch S3 and the fourth switch S4 are turned off or not by detecting the voltage at the node A. If it is off, it means that the mechanical switch K is closed (or the capacitive load is fully charged).

During the disconnection of the mechanical switch K, the third switch S3 is in the off state (or can be in the on state if the third switch S3 adopts a full-controlled device), and the control unit U detects that the contacts of the mechanical switch K are open (the disconnection of the contacts of the mechanical switch K can be detected by either detecting the voltage at the common node of the mechanical switch K and the load RL, or by an auxiliary switch of the mechanical switch K). And delay (optional) control the first switch S1 and the fourth switch S4 to be turned on, which can be done by a built-in microcontroller. The time value of delay is related to the disconnection speed of the corresponding mechanical switch K. When there is a certain distance between the contacts of the mechanical switch K, the first capacitor C1 starts to discharge to prevent arc re-ignition and improve the reliability of arc extinguishing. The control unit U knows whether the first switch S1 and the fourth switch S4 are in an on state by detecting the voltage at the node A (i.e., the common node of the series circuit formed by the first switch S1 and the first capacitor C1 and the fourth switch S4, or node D). Then the voltage across the load RL rises, the electric field strength between the contacts of the mechanical switch K rapidly decreases, thus achieving the purpose of rapidly extinguishing the arc of the mechanical switch K. The control unit U knows whether the first switch S1 and the fourth switch S4 are in an off state by detecting the voltage at the node A (or node D), so as to judge whether the first capacitor C1 completes discharging and prepare for the next discharging of the first capacitor C1. Note: When arc extinguishing is performing, the discharge of the first capacitor C1 is completed, and the arc of the mechanical switch K still exists (which can be known by the control unit U by detecting the voltage at node A and the voltage at node E of the second capacitor C2 under the conditions that the first switch S1 and the fourth switch S4 are turned off, and the second capacitor C2 cannot be discharged completely), the control unit U provides a pulse signal to trigger the third switch S3, the second switch S2 and the seventh switch S7 to turn on. Then recharging the first capacitor C1 and the second capacitor C2, and then perform arc extinguishing again. In the next operation, the control unit U will either increase the charging voltage for the first capacitor C1 or adjust the delay time.

The first capacitor C1 of this embodiment can be connected to the photocoupler voltage detection unit shown in FIG. 2 for detecting the charging voltage for the first capacitor C1.

Figure 7:
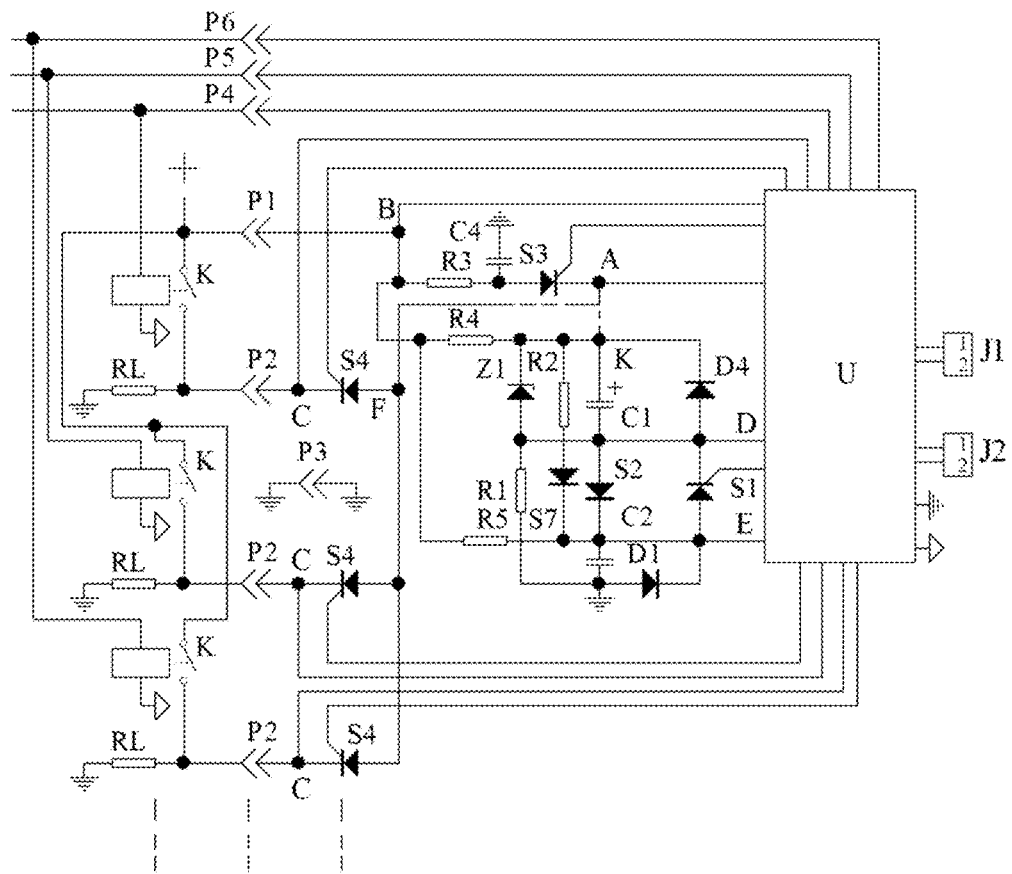
FIG. 7 is both schematic diagram 3 of a circuit of an embodiment of an arc extinguishing circuit according to the present invention and a schematic diagram of a circuit of an embodiment of an arc extinguishing apparatus according to the present invention.

The circuit schematic diagram 3 of an embodiment of the arc extinguishing circuit and the circuit schematic diagram of an embodiment of an arc extinguishing apparatus of the present invention is shown in FIG. 7.

An arc extinguishing circuit, FIG. 7 shows the addition of a third switch S3, a fourth switch S4, a third element R3 (a resistor or an inductor), a fourth capacitor C4, a first voltage regulator Z1 (a Zener diode, or a varistor, or a resistor for voltage stabilizing), a first diode D1, a second switch S2 (a second diode), a fourth element R4 (a resistor), and a fifth element R5 (a resistor) to FIG. 5. The third element R3 (optional), the third switch S3 (optional), the first capacitor C1, the second switch S2 (an uncontrolled switch, a diode; or a semi-controlled switch such as a unidirectional thyristor) and the second capacitor C2 form a third series circuit. The first power supply connected to the first series circuit (provided by the power supply connected to two ends of the first series circuit or provided by another power supply) charges the first capacitor C1 and the second capacitor C2 by the third series circuit; and the first power supply charges the second capacitor C2 by the third element R3 (optional), the third switch S3, the second element R2 and the seventh switch S7 (an uncontrolled switch, a diode; or a semi-controlled switch such as a unidirectional thyristor; the second element R2 and the seventh switch S7 form a second charging unit). The first voltage regulator Z1 (or a resistor) is connected in parallel with the first capacitor C1 for limiting the voltage across the first capacitor C1. An eighth series circuit is formed by the third element R3 (optional), the third switch S3 (optional), the first capacitor C1 and the first element R1 (the first charging unit), and the first power supply charges the first capacitor C1 by the eighth series circuit. The first switch S1, the first capacitor C1 and the fourth switch S4 form a second series circuit. During the disconnection of the mechanical switch K, the second power supply provided by the second capacitor C2 supplies power to the load RL by the second series circuit, so as to achieve the purpose of extinguishing arc of the mechanical switch K.

The capacitance of the first capacitor C1 is greater than that of the second capacitor C2 (the capacitance of the first capacitor C1 is greater than twice that of the second capacitor C2), and the charge of the first capacitor C1 is greater than that of the second capacitor C2. After the second capacitor C2 is discharged, the first capacitor C1 is discharged by the fourth switch S4, the load RL, the first diode D1 and the first switch S1.

If a design is adopted in which the capacitance of the second capacitor C2 is greater than that of the first capacitor C1 (the capacitance of the second capacitor C2 is greater than twice that of the first capacitor C1), the charge of the second capacitor C2 is greater than that of the first capacitor C1. After the first capacitor C1 is discharged, the second capacitor C2 is discharged by the first switch S1, the fourth diode D4, the fourth switch S4 and the load RL, and the first voltage regulator Z1 is changed to be connected in parallel with the second capacitor C2.

The charging mode in which the first capacitor C1 and the second capacitor C2 are connected in series has the advantages of fast charging speed and small loss.

Note: If the first power supply is not supplied by the power supply connected to the first series circuit and is input by the node A, the third element R3 and the third switch S3 are selected as required.

The third element R3 (optional), the third switch S3 and the fourth switch S4 form a fourth series circuit. Before the mechanical switch K is closed or during the closing of the mechanical switch K, the first power supply supplies power to the load RL by the fourth series circuit and is configured to close and extinguish arc of the mechanical switch K. Or to pre-charge the load RL (capacitive load, motor controller, DC converter, etc.), which can effectively overcome the current impact of capacitive load on the mechanical switch K.

An embodiment of an arc extinguishing apparatus of the present invention is an arc extinguishing apparatus comprising foregoing arc extinguishing circuit, which is an arc extinguishing apparatus (i.e., a mechanical switch intelligent management system) suitable for single or multiplex mechanical switch electronic control systems such as new energy vehicles, rail transit, aviation, automatic control, etc. and further comprises a control unit U. The control signals for the first switch S1, the second switch S2, the third switch S3 and the fourth switch S4 are provided by the control unit U. The voltage signal of the first capacitor C1 (the series circuit of a first capacitor C1 and a second capacitor C2) is transmitted to the control unit U for detecting the working states (breakdown, on or off) of the first switch S1, the third switch S3 and the fourth switch S4. The voltage signal of the power supply at the input of the mechanical switch K (via node B) is transmitted to the control unit U.

Working principle: After the input port of the mechanical switch K is powered on, the control unit U provides a pulse signal to trigger the third switch S3 to turn on and charge the first capacitor C1 and the second capacitor C2. During the whole charging operation, the control unit U knows the capacitance of the series circuit of the first capacitor C1 and the second capacitor C2 by detecting the voltage (configured to judge whether the capacitance of the first capacitor C1 and the second capacitor C2 are within the normal values or not, and optimizing the arc extinguishing control program according to the collected data). The control unit U knows the capacitance of the second capacitor C2 (configured to judge whether the capacitance of the second capacitor C2 is normal or not, and optimizing the arc extinguishing control program according to the collected data) by detecting the voltage of node D (or node E). During the closing of the mechanical switch K, the control unit U provides a pulse signal to trigger the third switch S3 and the fourth switch S4 to turn on (it's optional according to requirement). The control unit U knows whether the third switch S3 and the fourth switch S4 are turned off or not by detecting the voltage at the node A (i.e. the common node of the third switch S3 and the fourth switch S4). If it is off, it means that the mechanical switch K is closed (or the capacitive load is fully charged).

During the disconnection of the mechanical switch K, the third switch S3 is in the off state (or can be in the on state if the third switch S3 adopts a full-controlled device), and the control unit U detects that the contacts of the mechanical switch K are open. Then delay (optional) control the first switch S1 and the fourth switch S4 to be turned on, which can be done by a built-in microcontroller. The time value of delay is related to the disconnection speed of the corresponding mechanical switch K. When there is a certain distance between the contacts of the mechanical switch K, the first capacitor C1 starts to discharge to prevent arc re-ignition and improve the reliability of arc extinguishing. Then the voltage across the load RL rises, the electric field strength between the contacts of the mechanical switch K rapidly decreases, thus achieving the purpose of rapidly extinguishing the arc of the mechanical switch K. The control unit U knows whether the first switch S1 and the fourth switch S4 are in an off state by detecting the voltage at the node A (i.e. the common node of the series circuit composed of the first switch S1 and the first capacitor C1 and the fourth switch S4, or node D), so as to judge whether the first capacitor C1 completes discharging and prepare for the next discharging of the first capacitor C1. Note: When arc extinguishing is performing, the discharge of the first capacitor C1 is completed, and the arc of the mechanical switch K still exists (under the conditions that the first switch S1 and the fourth switch S4 are turned off, and the second capacitor C2 or the first capacitor C1 cannot be discharged completely), the control unit U provides a pulse signal to trigger the third switch S3 to turn on. Then recharging the first capacitor C1 and the second capacitor C2, and then performing arc extinguishing again. In the next operation, the control unit U will adjust the delay time.

The fourth capacitor C4 (the ground port of the fourth capacitor C4 can be changed into a controllable semiconductor switch connected in series, and the fourth capacitor C4 is connected in parallel with the third switch S3 by a controllable semiconductor switch. The controllable semiconductor switch is preferably a unidirectional thyristor, and the control signal of which is provided by the control unit U and is defined as an eleventh switch) connected to the common node of the second element R2 (shown in FIG. 6; or the third element R3, shown in FIG. 7) and the third switch S3 is configured to overcome the overvoltage caused by the input power of the mechanical switch K due to the rapid disconnection of the mechanical switch K, and prevent the third switch S3 from being misled and damaged by breakdown. The power supply (the power supply of the input port of the mechanical switch K) is connected to the first capacitor C1 and the second capacitor C2 by the fourth element R4 and the fifth element R5, respectively. Therefore, it is not necessary to frequently control the third switch S3 to be turned on and to recharge the first capacitor C1 and the second capacitor C2, thus overcoming the influence on the arc extinguishing response speed. The current passing through the fourth element R4 and the fifth element R5 is less than the minimum on-current maintained by the third switch S3 (e.g. a semi-controlled device) and the fourth switch S4. If the third switch S3 adopts a full-controlled device, the fourth element R4 and the fifth element R5 can be omitted.

FIG. 6 and FIG. 7 can achieve the same technical effect by referring to the circuits of the sixth element R6 and the eighth switch S8 added as shown in FIG. 4 (see the related description of an embodiment of the present invention).

Figure 8:
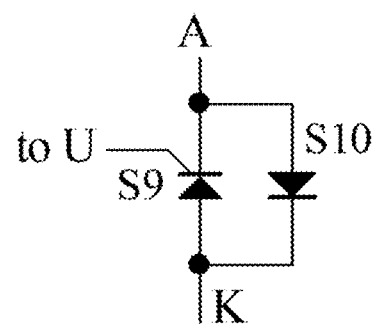
FIG. 8 is a schematic diagram of a circuit of ninth switch of an arc extinguishing circuit according to the present invention.

The node A and node K of FIG. 6 and FIG. 7 are connected in series with the ninth switch S9 (a controllable switch using a unidirectional thyristor whose control signal is provided by the control unit U) shown in FIG. 8, i.e. the first capacitor C1 and the ninth switch S9 form a series circuit. The voltage signal of the connection node (i.e. node A) of the series circuit is connected to the control unit U with the of the common node (i.e. node A) of the third switch S3 and the fourth switch S4, so as to conveniently detect the working states (on, off and breakdown , and is not affected by the fourth element R4, the fifth element R5 and the first capacitor C1; No high-resolution AD acquisition is required, and high-low level acquisition can also be used) of the third switch S3 and the fourth switch S4. When the ninth switch S9 for detection uses a bidirectional thyristor, the tenth switch S10 (a diode) connected (in parallel) to the ninth switch S9 can be omitted. Note: the tenth switch S10 is not limited to being connected in parallel with the ninth switch S9, and the anode of the tenth switch S10 (e.g., a unidirectional thyristor whose control signal is provided by the control unit U) can be connected to the input power supply port of the mechanical switch K by a current limiting element (e.g., the second element R2 in FIG. 6 or the third element R3 in FIG. 7).

The charging power supply of the first capacitor C1 and the second capacitor C2 are both provided by the power supply (the first power supply) connected at two ends of the first series circuit, and the second power supply is provided by the second capacitor C2, which has the advantages of simple circuit, high cost performance and safety. When the system voltage is in a high level, the first capacitor C1 adopts an electrolytic capacitor and the second capacitor C2 adopts a non-polar capacitor, thus greatly reduces the volume and saves the cost.

In the arc extinguishing apparatus of the present invention, the fourth switch S4 is not limited to the control signal provided by the control unit U, and the control electrode of the fourth switch S4 can also be grounded by a capacitor (a fifth capacitor) or connected with the input port of the mechanical switch K by a capacitor (a fifth capacitor) for detecting the disconnection of the mechanical switch K. It is suggested that the third switch S3 to adopt a full-controlled switch.

When there are two or more fourth switches in the embodiments of the arc extinguishing apparatus of the present invention, it is suggested that the control unit detect the working state (on, off and breakdown) of the fourth switch, and each fourth switch is connected in series with at least one diode to ensure the safety of system operation. Because once any one of the fourth switches breaks down, the current output by the mechanical switch connected by the broken down fourth switch will easily string into other loads.

The control unit U of the arc extinguishing apparatus of the present invention has a built-in programmable device (such as a microcontroller). In order to simplify the circuit of the control unit, the programmable device can be selected to be designed to share the ground with the load RL, which is beneficial to non-electrical isolation (non-photoelectric isolation, non-electromagnetic isolation) AD acquisition, level acquisition or voltage comparison of various voltage signals. For example, AD acquisition is carried out on node A, node B, node C, node D, node E (if it exists) and node F (if it exists) (voltage signals at each node are transmitted to input ports of programmable device by resistor voltage division, and voltage signals of each node are the voltage signals of each node to ground); Or level acquisition (the voltage signals of each terminal drives the transistor by the resistor, and the output signal of the transistor is transmitted to the input port of the programmable device. The voltage signals at each node are the voltage signals at each terminal to ground) is carried out; Or voltage comparison (the voltage across mechanical switch K) is carried out. In order to facilitate the programmable device to control the second switch S2 (or the third switch S3), the voltage signal at the common node of the mechanical switch K and the load RL can also be provided to the control unit U (the voltage signal can be the voltage across the mechanical switch K, the fourth switch S4 and the load RL) simultaneously.

When the programmable device selects the design of electrical isolation (photoelectric isolation, electromagnetic isolation) from the load RL, the control unit U can collect various voltage signals by the photocoupler. Such as level acquisition for each terminal (the voltage signals of each node can drive the photocoupler by the resistor, and the output signal of the photocoupler is transmitted to the input port of the programmable device. The voltage signals at each node are the voltage signals at each terminal to ground) for each terminal. Simultaneously, the voltage signal at the common node of the mechanical switch K and the load RL can also be provided to the control unit U by the photocoupler (the voltage signal can be the voltage across the mechanical switch K, the fourth switch S4 and the load RL; the voltage signal can drive the photocoupler by the resistor, and the output signal of the photocoupler is transmitted to the input port of the programmable device).

The control unit U has a built-in intelligent unit that can control the program, which is able to realize the adjustment of the control mode of the multiplex load RL according to respective different conditions (capacitive, inductive, resistive and current) under the condition that hardware resources are not increased or a few hardware resources are increased, so as to improve the arc extinguishing effect and prolong the electrical life of the mechanical switches K. In addition, it's beneficial to simplifying the circuit as well as complete timing (delay control the conduction of switch), A/D (or level) acquisition, voltage comparison (e.g. voltage across the mechanical switch), logic processing, control the charging and discharging of the first capacitor C1 (or the third capacitor C3, or the second capacitor C2), etc. The first capacitor C1 (or the third capacitor C3, or the second capacitor C2) and the control unit U are jointly configured to arc extinguishing control of multiplex mechanical switch K (the mechanical switches can be connected in series or in parallel with each other), closing arc extinguishing of the mechanical switches K (or pre-charging the load RL) and detection (closed state, open state, arcing, and if each state is stable and normal). The service life of the mechanical switch K is calculated according to the arcing condition and operation times of the mechanical switch K, and relevant information (fault code, operation times of the mechanical switch, electrical life, mechanical service life, working state, etc.) is transmitted or displayed, which is beneficial to improving the overall safety of the electric control system, easy maintenance and has the characteristic of higher cost performance. It can be widely applied to the fields of new energy vehicles, rail transit, vessels, aviation and automatic control, and is used as a multiplex mechanical switch intelligent management system with the functions of increasing the electrical life of the mechanical switch, calculating the service life of the mechanical switch, predicting the end of the life and detecting the working state of the mechanical switch.

Since the electrical characteristics of the multiplex mechanical switch K connected with the control unit U and the multiplex load RL are not necessarily consistent, in order to achieve the best arc extinguishing effect, the control unit U either stores the parameters related to the current of the load RL, or receives the parameters or signals related to the current of the load RL, or the operation time parameters of the mechanical switch K. The charging voltage for the first capacitor C1 is proportional to the current passing through the mechanical switch K requiring arc extinguishing (the control unit U controls the second switch S2 to adjust the charging voltage). During the disconnection of the mechanical switch K, the delayed conduction time of the first switch S1 and the fourth switch S4 is proportional to the current of the load RL, and the delayed time parameter can be completed by a programmable device which is built-in the control unit U, thus being beneficial to reducing the influence of overvoltage on the system in the arc extinguishing process and achieving the best arc extinguishing effect.

The control signal for the mechanical switch K (not only to be provided by the control port of the mechanical switch K, but also provided by port J2) is either transmitted to the control unit U, or the control signal for the mechanical switch K is provided by the control unit U, or the auxiliary switch signal of the mechanical switch K is transmitted to the control unit U, which is beneficial to controlling the conduction of the fourth switch S4 and the third switch S3 in advance before the mechanical switch K is closed, improving the accuracy and real-time of arc extinguishing, and is more beneficial to optimizing the control of the action logic and arc extinguishing control logic of each mechanical switch, which is selected as required.

The control unit U is configured to record the operation times of the mechanical switch. The control unit U detects if the contacts of the mechanical switch K are open.

The control unit U can include a display unit or be connected with a display unit (which can be connected by a communication port) for displaying information such as the operation state and operation times of the mechanical switch K, the arc extinguishing operation state, and the remaining life (mechanical life and electrical life); The control unit U can include an input unit (keys etc.) or be connected with an input unit (the communication port connection can be adopted).

The mechanical switch K requiring arc extinguishing in the arc extinguishing apparatus can adopt a mechanical switch (relay, contactor, travel switch and the like) which itself do not have disconnecting ability (voltage and current disconnecting ability) under working conditions, thereby achieving the purposes of greatly reducing cost, weight and volume of the mechanical switches.

Simultaneously, compared with mechanical switches with disconnecting ability, mechanical switches without disconnecting ability have slower disconnecting and closing speed of mechanical contacts, less mechanical impact and higher operating electric life. When the mechanical switch is in a moving state and under the condition of unexpected mechanical impact (e.g., collision and rollover) may occur, the mechanical switch K may either accidentally close and disconnect in a normally open state, or the opening distance may become smaller, or the impact voltage may occur across the mechanical switch K, then arcing may occur. When the control unit U detects arcing under the disconnection state of the mechanical switch K, the control unit U controls the first switch S1 and the fourth switch S4 to perform arc extinguishing.

Figure 9:
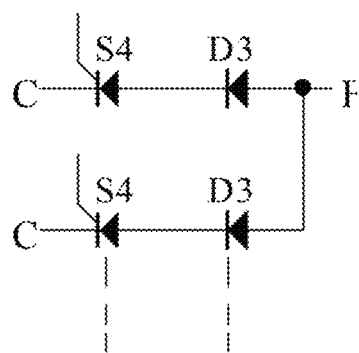
FIG. 9 is a schematic diagram of a circuit of fourth switch connected in series with diode of an arc extinguishing circuit according to the present invention.

When number of mechanical switch K, load RL and fourth switch S4 is two or more, sharing resources such as the first capacitor C1, the first switch S1, the second switch S2, the third switch S3 and control unit U can achieve the purposes of greatly saving cost and reducing volume. In the meanwhile, the arc extinguishing voltage is greater than the working voltage of the load RL, which has the advantages of effectively overcoming the line loss caused by the overlong arc extinguishing circuit loop of the first capacitor C1 relative to each load RL due to the scattered layout of the multiplex mechanical switch K, providing sufficient arc extinguishing current, and improving the arc extinguishing effect. Limiting the effective value of arc extinguishing current by capacitor (The first capacitor C1 can also be connected in series with current limiting elements, such as an inductor, and can also limit the rise rate of arc extinguishing current to reduce peak current) is adopted to prevent the risk of power supply to other loop loads RL caused by breakdown of the fourth switch S4. All mechanical switches K requiring arc extinguishing are connected with the common node of the load RL by a fourth switch S4; The fourth switch S4 of each circuit is connected in reverse series (the voltage tolerance value is the sum of the voltage tolerance values of the two fourth switch S4), thus the problem that the mechanical switch K supplies power to the load RL connected with the other mechanical switch K caused by misleading communication does not exist. Furthermore, it has the advantages of high withstand voltage between the output ports of mechanical switch K of each circuit (easily reaches 4000V if the fourth switch S4 adopts a unidirectional thyristor), fast response speed (by selecting the first capacitor C1 with appropriate capacitance, the apparatus can easily meet the requirement of disconnecting and extinguishing arc dozens of times or even hundreds of times in one second.), small volume, low cost, no limitation of arc extinguishing operation times and the like. When the system voltage is in a high level, in order to further improve the safety, the fourth switch S4 can be composed of a semi-controlled device (e.g., a unidirectional thyristor can withstand voltages of 1500V to 2000V in conventional models, and unidirectional thyristors with rated current of 25 amperes can be configured to extinguish arc of mechanical switches with current of thousands of amperes.) connected in series with one or more diodes (the standard withstand voltage is up to 1000-2000V; diode with rated current of 10 amperes can extinguish arc of mechanical switch with current of thousands of amperes) and is define as a ninth series circuit (each ninth series circuit is in a reverse series connection relation, as shown in FIG. 9). In this way, the insulation withstand voltage between the output ports of various mechanical switches can be greatly improved (easily reaching 6000V, even greater than 10,000V), and has the advantages of low cost, high withstand voltage capability, strong overcurrent capability and high reliability.

In the foregoing embodiment, the first element R1, the second element R2 and the third element R3 are used as current limiting elements, which can be a resistor or an inductor, or a disconnectable (fusing) element for protection when any one or two of the second switch S2, the third switch S3 and the fourth switch S4 are abnormally turned on, configured to current limiting or disconnection protection, and can be selected according to requirement (or selected one for use, and omitted if other current limiting exists in the circuit). An inductor connected in series with the first capacitor C1 can be configured to current limit while charging. The control unit U uses pulses (pulse groups) to drive the second switch S2 (simultaneously, the third switch S3 can be a full-controlled switch or a mechanical switch) to charge the first capacitor C1 so as to adjust the charging voltage for the first capacitor C1.

In the foregoing embodiment, the first switch S1, the second switch S2, the third switch S3, the fourth switch S4, and the sixth switch S6 (the fifth switch S5) are preferably controllable switches (are semiconductor switches, controllable semiconductor devices). The third switch S3 can adopt either a semi-controlled switch (a semiconductor switch, semi-controlled semiconductor device, unidirectional thyristor) or a full-controlled switch (semiconductor switch, full-controlled semiconductor device, which can be configured to adjust the charging voltage for the first capacitor C1), which has the advantage of fast response speed. The first switch S1, the fourth switch S4 and the sixth switch S6 are preferably semi-controlled switches (are semiconductor switches, semi-controlled semiconductor devices, and the control unit U drives the semi-controlled switches to turn on by a transformer), and have the advantages of extremely high overload capability (if the first switch S1 and the fourth switch S4 adopt unidirectional thyristors with rated working current of 25 amperes, the arc of mechanical switch K which passing through hundreds of or even thousands of amperes can be safely and reliably extinguished), high forward and reverse withstand voltage, low cost, and convenient control (can be triggered by transformer pulses). If the second switch S2 (or the third switch S3) adopts a full-controlled switch (a full-controlled semiconductor device such as a triode, or field effect transistor, or IGBT), it is convenient to adjust the charging voltage for the first capacitor C1 (it is recommended that the charging voltage is not greater than 50% of the working voltage of the load RL, the charging voltage can be adjusted according to the magnitude of the load RL current, and the charging voltage is the voltage across the first capacitor C1), so as to prevent the influence of overvoltage on the load RL. During the disconnection of the mechanical switch K, the pulse voltage provided to the load RL by the first capacitor C1 (or the series circuit comprising the second capacitor C2, the first switch S1 and the first capacitor C1) is greater than the working voltage of the load RL, and is not greater than double (preferably not greater than 1.5 times) of the working voltage of the load RL.

In the foregoing embodiment, under the working condition that the control unit U detects arc extinguishing failure (whether the first switch S1 or the fourth switch S4 is turned off is detected by the control unit U; or according to the voltage of the first capacitor C1; or according to the voltages of the first capacitor C1 and the second capacitor C2), charging the first capacitor C1 again by the second switch S2 (or the third switch S3; or the second switch S2 and the third switch S3) and then carry out the secondary arc extinguishing, thus greatly improving the reliability of arc extinguishing and the response speed of the secondary arc extinguishing.

On the basis of the foregoing embodiment, the mechanical switch K can be connected in series with a unidirectional conduction device (a diode or a unidirectional thyristor) for preventing the backward current of the first capacitor C1. If the current is large, the unidirectional conduction device can be connected in parallel with a bypass switch (a mechanical switch), and the control signal for the bypass switch is provided by the control unit U.

In the foregoing embodiment, the port J1 can be externally connected with a power port (optional); the port J2 is a communication port for transmitting and receiving relevant information.

Figure 10:
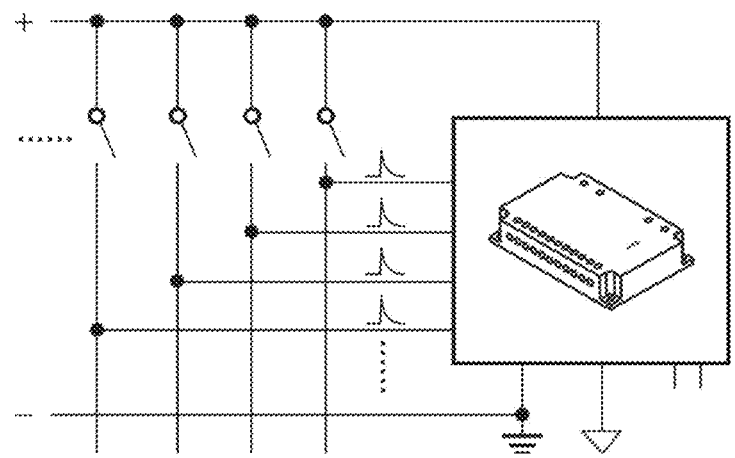
FIG. 10 is a schematic diagram of a circuit of an embodiment of an arc extinguishing apparatus according to the present invention.

An embodiment of an arc extinguishing apparatus of the present invention is shown in FIG. 10;

A single or multiple mechanical switch management system (single or multiple mechanical switch arc management system), places the arc extinguishing apparatus in a shell. As a universal product, which is connected with external mechanical switches by ends, upper computers and the like, which is convenient for safety certification and popularization and application. The specific appearance of the product can be flexibly designed according to requirements.

In the foregoing embodiment, when number of mechanical switch K, load RL and fourth switch S4 is two or more, sharing resources such as the first capacitor C1, the first switch S1, the second switch S2, the third switch S3 and control unit U (sharing a programmable device). The semiconductor device is configured to interconnect various loads, so as to achieve the purposes of greatly saving cost, reducing volume, improving response speed of electronic arc extinguishing and the like. It is not only an intelligent electronic arc extinguishing system with the function of increasing electrical life of mechanical switch, but also a multiplex mechanical switch intelligent management system for calculating the service life and predicting the end of the service life of the mechanical switch, recording the operation times of the mechanical switch and detecting the working states of the mechanical switch without increasing hardware resources. Further, it can also greatly reduce the manual maintenance cost and operation cost of the system (electric control system), improve the safety of system operation, and improve the intelligent level of equipment. The heavy and expensive mechanical switches with high disconnecting ability are no longer required (change the original electrical design standard), the environmental pollution caused by frequent switch replacement is reduced, the economic value and social value is high, and is extremely conducive to changing the current situation that electronic arc extinguishing is difficult to popularize.

Figure 11:
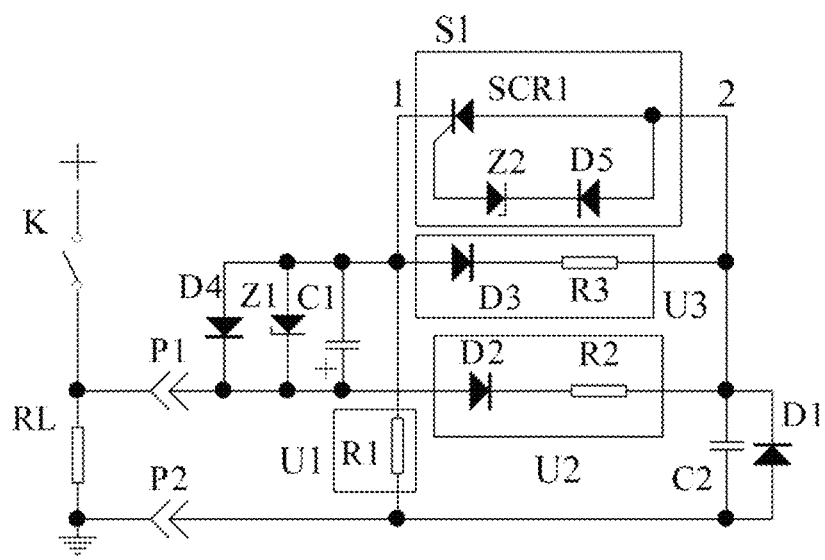
FIG. 11 is schematic diagram 1 of a circuit of an embodiment of an arc extinguishing apparatus according to the present invention.

An embodiment of an arc extinguishing apparatus of the present invention is shown in FIG. 11;

An arc extinguishing apparatus, where a mechanical switch K requiring arc extinguishing is connected in series with a load RL to form a first series circuit, comprising a first switch S1, a first capacitor C1, a first charging unit U1 (a first element R1, a resistor), a second charging unit U2 (the second diode D2 and the second element R2 are connected in series, or use the second diode D2, or the second element R2), a third charging unit U3 (the third diode D3 and the third element R3 are connected in series, or use the third diode D3, or the third element R3) and a second capacitor C2. When the mechanical switch K is closed, the first power supply which is provided by the power supply across the load RL charges the first capacitor C1 by the first charging unit U1, namely, the series circuit composed of the first capacitor C1 and the first element R1 is connected in parallel with the load RL. And the first power supply charges the second capacitor C2 by the second charging unit U2. The first capacitor C1, the third charging unit U3 and the second capacitor C2 form a tenth series circuit, and the first power supply charges the first capacitor C1 and the second capacitor C2 by the tenth series circuit.

During the disconnection of the mechanical switch K, the second power supply, which is provided by the second capacitor C2, supplies power to the load RL by the first switch S1 and the first capacitor C1 (the first switch S1 and the first capacitor C1 form a second series circuit), so as to achieve the purpose of extinguishing arc of the mechanical switch K, namely the voltage of the second capacitor C2 and the voltage of the first capacitor C1 are added up.

When the capacitance of the first capacitor C1 (an electrolytic capacitor can be used) is greater than that of the second capacitor C2 (the capacitance of the first capacitor C1 is greater than twice that of the second capacitor C2), the first capacitor C1 is connected in parallel with the first voltage regulator Z1 or a resistor for limiting the charging voltage for the first capacitor C1. The first diode is connected in parallel with the second capacitor C2. The first capacitor C1 is connected in parallel with the fourth diode D4. And the charge of the first capacitor C1 is greater than that of the second capacitor C2. After the second capacitor C2 is discharged, the first capacitor C1 is discharged by the fourth switch S4, the load RL, the first diode D1 and the first switch S1.

If a design is adopted in which the capacitance of the second capacitor C2 (an electrolytic capacitor can be used) is greater than that of the first capacitor C1 (the capacitance of the second capacitor C2 is greater than twice that of the first capacitor C1), the charge of the second capacitor C2 is greater than that of the first capacitor C1. After the first capacitor C1 is discharged, the second capacitor C2 is discharged by the first switch S1, the fourth diode D4 and the load RL, and the first voltage regulator Z1 is changed to be connected in parallel with the second capacitor C2.

The series connection of the first capacitor C1 and the second capacitor C2 has the advantages of fast charging speed and low power consumption.

The first switch S1 is a voltage detection switch configured to either detect the potential difference or voltage change rate between the first capacitor C1 and the second capacitor C2, or detect the voltage drop rate across the load RL. The power supply is provided by either the voltage between the first capacitor C1 and the second capacitor C2, or by the voltage across the load RL without isolation. The voltage input port and the output port of the voltage detection switch are not electrically isolated, and the first switch S1 is divided into two types of potential difference detection switch and voltage change rate detection switch;

The first switch S1 shown in FIG. 11 is a potential difference detection switch, and it's configured to detect the potential difference between the first capacitor C1 and the second capacitor C2. The first switch S1 comprises a fifth diode D5, a second voltage regulator Z2 and a first semi-controlled device SCR1. The second capacitor C2 triggers the first semi-controlled device SCR1 to turn on by the second voltage regulator Z2 (the voltage stabilizing value of the second voltage regulator Z2 needs to be greater than the peak-to-peak value of the ripple voltage) and the fifth diode D5, and the second capacitor C2, the first semi-controlled device SCR1 and the first capacitor C1 form a pair of power supply circuits for supplying power to the load RL for disconnecting and extinguishing the arc of the mechanical switch K.

Figure 12:
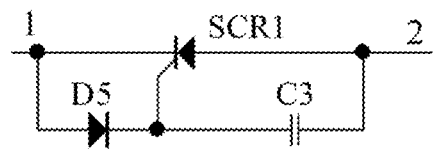
FIG. 12 is schematic diagram 2 of a circuit of an embodiment of an arc extinguishing apparatus according to the present invention.

The first switch S1 shown in FIG. 12 is a voltage change rate detection switch, which comprises a third capacitor C3 and a first semi-controlled device SCR1. The third capacitor C3 inputs a voltage signal, and the first switch S1 is configured to detect the voltage change rate between the first capacitor C1 and the second capacitor C2. If the third capacitor C3 is changed to be connected in ground with the load RL, the first switch S1 is configured to detect the voltage change rate across the load RL.

Figure 13:
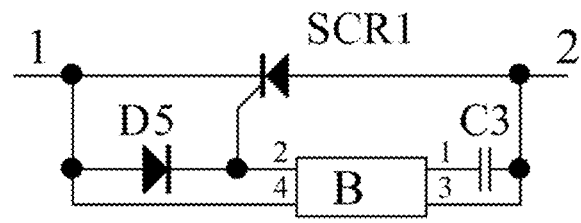
FIG. 13 is schematic diagram 3 of a circuit of an embodiment of an arc extinguishing apparatus according to the present invention.

The first switch S1 shown in FIG. 13 is a voltage change rate detection switch, which comprises a third capacitor C3, a first semi-controlled device SCR1 and a delay unit B. The third capacitor C3 inputs a voltage signal, and the first switch S1 is configured to detect the voltage change rate between the first capacitor C1 and the second capacitor C2. If the fourth end of the delay unit B is changed to be connected with the common node of the mechanical switch K and the load RL, the first switch S1 is configured to detect the voltage change rate between the common node of the mechanical switch K and the load RL and the second capacitor C2. If the third capacitor C3 is changed to be connected in ground with the load RL, the first switch S1 is configured to detect the voltage change rate across the load RL (the voltage across the load RL triggers the first semi-controlled device SCR1 to turn on by the third capacitor C3).

Figure 14:
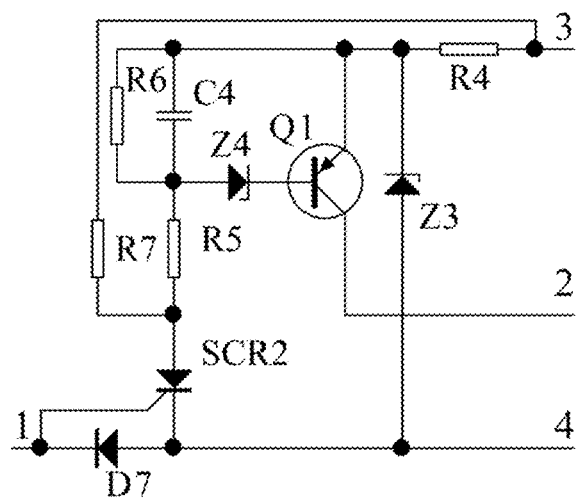
FIG. 14 is schematic diagram 4 of a circuit of an embodiment of an arc extinguishing apparatus according to the present invention.

The specific circuit of the delay unit B can adopt the circuit shown in FIG. 14, which comprises a power supply circuit (composed of a fourth element R4 and a third voltage regulator Z3), a delay circuit (composed of a fifth element R5, a sixth element R6, a fourth capacitor C4, a first transistor Q1 and a fourth voltage regulator Z4, and a first-stage current amplifying circuit can be added to the output port of the first transistor Q1 according to requirements), and a semi-controlled switch circuit (composed of a seventh diode D7, a second semi-controlled switch SCR2 and a seventh element R7). The working power provided by the second capacitor C2 is limited by the fourth element R4, and the third voltage regulator Z3 stabilizes the voltage to provide working energy for the delay circuit. During the disconnection of the mechanical switch K, at the moment when the mechanical contacts are disconnected, the voltage across the load RL drops at a great rate. The current passes through the third capacitor C3 is sufficient to drive the second semi-controlled switch SCR2 to turn on, and the conducting signal of the second semi-controlled switch SCR2 is transmitted to the delay circuit to drive the first semi-controlled device SCR1 to turn on with delay, thus achieving the purpose of arc extinguishing of the mechanical switch K.

Figure 15:
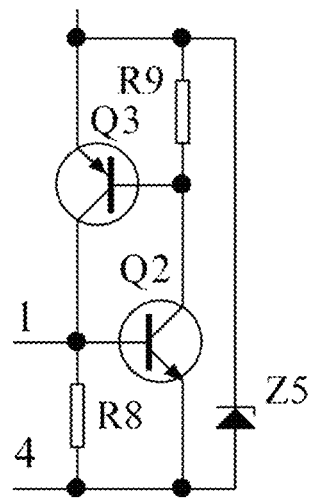
FIG. 15 is schematic diagram 5 of a circuit of an embodiment of an arc extinguishing apparatus according to the present invention.

The second semi-controlled switch SCR2 can adopt a unidirectional thyristor. In order to save cost and adjust electrical parameters conveniently, it is suggested to replace it with a thyristor equivalent circuit. As shown in FIG. 15, it adopts a thyristor equivalent circuit which is composed of two transistors, and it is also connected in parallel with the fifth voltage regulator Z5.

Figure 16:
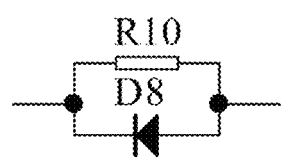
FIG. 16 is schematic diagram 6 of a circuit of an embodiment of an arc extinguishing apparatus according to the present invention.

In this embodiment, it is suggested that the third capacitor C3 to be connected in series with a parallel circuit (as shown in FIG. 16) composed of a resistor R10 (a tenth element) and a diode D8 (an eighth diode), because the parallel circuit can overcome the inrush current caused by the closing of the mechanical switch K and does not affect the accuracy of the detection of the voltage change rate by the first switch S1.

When the first switch S1 adopts a voltage change rate detection switch, it is especially suitable for occasions with large voltage fluctuation or large ripple, such as battery power supply systems such as electric vehicles or AC rectification power supply systems.

This embodiment is a two-end circuit and has the advantages of simple circuit, high reliability and convenient use.

Figure 17:
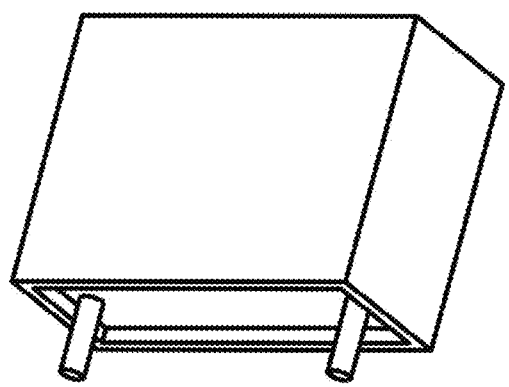
FIG. 17 is a schematic diagram of a circuit of an embodiment of an arc extinguishing apparatus according to the present invention.

An embodiment of an arc extinguishing apparatus of the present invention is shown in FIG. 17.

In order to facilitate application and popularization, an embodiment of the arc extinguishing apparatus of the present invention is packaged into a device by using insulating materials. As a universal product, it is convenient for safety certification, and its specific appearance can be flexibly designed according to requirements.

In the foregoing embodiment, the capacitance of the first capacitor C1 is preferably selected such that the conduction time of the first switch S1 is not greater than 1 millisecond (preferably within 200 microseconds, a satisfactory arc extinguishing effect can be achieved as long as a pulse current of several tens of microseconds is supplied to the load).

In the foregoing embodiment, the first power supply for charging the first capacitor C1 is provided by the power supply connected by the first series circuit without isolation, that is, non-electromagnetic isolation.

The foregoing full-controlled switches are preferably full-controlled semiconductor devices (semiconductor switches), such as triode, FET, IGBT, etc. (diode can be built in).

The foregoing semi-controlled switches are preferably semi-controlled semiconductor devices (semiconductor switches), e.g. unidirectional thyristors and other types of devices.

In the foregoing embodiment, either the first switch S1 or the fourth switch S4 is preferably connected in series with at least one diode to prevent sudden occurrence of reverse voltage (e.g., bouncing of the mechanical switch K) in its in-state and damage to the first switch S1 or the fourth switch S4.

In the foregoing embodiment, the first capacitor C1 can be connected in series with an inductor to limit the current (the inductor can be omitted if the first capacitor C1 has a large internal resistance to the load RL working line), which is configured to extend the power supply time of the first capacitor C1 to the load RL and reduce the current rising rate. The selection of series inductance should meet the requirement that the apparatus can make the current rise rate through the first switch S1 less than the limit rise rate of the first switch S1 under actual working conditions. In order to achieve the best efficiency and safety, a conductor can be used to short-circuit both ends of load RL on site; or use a capacitor (or other capacitive or resistive load) in parallel connection with the two ends of the load RL. The first capacitor C1 is charged, then the first switch S1 is turned on, and the voltage of the second power supply and the voltage of the first capacitor C1 are added up, so that the current rising rate of the first switch S1 is less than the limit rising rate of the first switch S1.

In summary, the present invention has the following advantages;

1. The capacitance utilization rate of the capacitor is high, the charging speed of the capacitor is fast, the charging voltage for the capacitor can be adjusted, and the influence on system overvoltage is reduced.

2. It can provide a voltage greater than the input power supply voltage of the mechanical switch to the load, and can also output a great arc extinguishing current under the conditions of long circuit loop, small wire diameter and large internal resistance (1 square wire can transmit current of hundreds to thousands of amperes).

3. The charging power of the capacitor is provided by non-isolated power supply connected to mechanical switch (electromagnetic isolation, transformer isolation), and no transformer is required to increase arc extinguishing voltage, and no need to improve the withstand voltage requirement of capacitor. And has the advantages of simple circuit, small volume, low cost and high reliability.

4. Have the advantages of fast response speed, large output current and good arc extinguishing effect.

What is claimed is:

1. An arc extinguishing circuit, comprising:
   a mechanical switch requiring arc extinguishing configured to connect in series with a load to form a first series circuit;
   a first switch, a first charging unit and a first capacitor;
   a second capacitor and a second charging unit for charging the second capacitor, wherein the second charging unit is a second element, or a seventh switch, or composed of a second element and a seventh switch connected in series;
   a first power supply configured to charge the first capacitor by the first charging unit, wherein the first power supply is provided by a power supply connected to the first series circuit; and
   a second power supply configured to supply power to the load by the first switch and the first capacitor during disconnection of the mechanical switch and provided by the second capacitor.

2. The arc extinguishing circuit according to claim 1, wherein the first charging unit comprises a second switch, and the first switch and the second switch are semiconductor switches.

3. The arc extinguishing circuit according to claim 2, wherein the second switch is configured to adjust a charging voltage for the first capacitor.

4. The arc extinguishing circuit according to claim 1, wherein the first charging unit is composed of a first element and a second switch connected in series, and the first capacitor is configured to be discharged by the first element and the second switch.

5. The arc extinguishing circuit according to claim 1, wherein the first power supply is provided by two ends of the load, and the second power supply is provided by a power supply connected across the first series circuit.

6. The arc extinguishing circuit according to claim 1, wherein the first power supply is provided by two ends of the load or by a power supply connected across the first series circuit.

7. The arc extinguishing circuit according to claim 1, further comprising a second switch, a third switch, and a fourth switch, wherein the third switch, the first capacitor, and the second switch form a third series circuit, and the third series circuit is configured to charge the first capacitor; the first power supply is configured to charge the second capacitor by the third switch and the second charging unit; the first switch, the first capacitor, and the fourth switch form a second series circuit; the second power supply supplies power to the load by the second series circuit during the disconnection of the mechanical switch; and a number of the mechanical switch is one, two or more, a number of the load is one, two or more, and a number of the fourth switch is one, two or more.

8. An arc extinguishing apparatus comprising the arc extinguishing circuit according to claim 1, wherein the first charging unit comprises a first element, the first power supply is provided by two ends of the load; the arc extinguishing circuit further comprises a second charging unit; the first power supply is configured to charge the first capacitor by the first element, and the first power supply is configured to charge the second capacitor by the second charging unit;

the first capacitor is connected with a voltage regulator or a resistor in parallel; the first switch is a voltage detection switch, and the voltage detection switch is configured to detect a potential difference or a voltage change rate between the first capacitor and the second capacitor, or detect a drop rate of a voltage across the load.

9. An arc extinguishing circuit comprising:
a mechanical switch configured to be connected in series with a load to form a first series circuit;
a first switch and a first capacitor;
a first charging unit comprising a second switch, wherein the first switch and the second switch are semiconductor switches;
a first power supply configured to charge the first capacitor by the first charging unit, wherein the first power supply is provided by a power supply connected to the first series circuit;
a third switch, wherein the third switch, the first capacitor and the second switch form a third series circuit, and the third series circuit is configured to charge the first capacitor; and
a second power supply configured to supply power to the load by the first switch and the first capacitor during disconnection of the mechanical switch so as to provide arc extinguishing.

10. The arc extinguishing circuit according to claim 9, further comprising a fourth switch, wherein the first switch, the first capacitor, and the fourth switch form a second series circuit, and the second power supply supplies power to the load by the second series circuit during the disconnection of mechanical switch, and wherein a number of the mechanical switch is one, two or more, a number of the load is one, two or more, and a number of the fourth switch is one, two or more.

11. The arc extinguishing circuit according to claim 10, wherein the second power supply is provided by a power supply connected across the first series circuit.

12. The arc extinguishing circuit according to claim 10, wherein the third switch and the fourth switch form a fourth series circuit, and during the disconnection of the mechanical switch, the second power supply supplies power to the load by the fourth series circuit.

13. The arc extinguishing circuit according to claim 10, further comprising a first diode,
wherein the first capacitor is discharged by the first diode and the third switch, or the first capacitor is discharged by the second switch and the first diode.

14. The arc extinguishing circuit according to claim 10, wherein the third switch is a full-controlled switch or a semi-controlled switch; and the fourth switch is a semi-controlled switch.

15. The arc extinguishing circuit according to claim 10, wherein the fourth switch is a semiconductor switch.

16. The arc extinguishing circuit according to claim 15, wherein the fourth switch is connected in series with at least one diode.

17. An arc extinguishing apparatus comprising the arc extinguishing circuit according to claim 10, further comprising a control unit, wherein control signals for the first switch, the second switch, and the third switch are provided by the control unit;
a control signal for the fourth switch is provided by the control unit, or a control electrode of the fourth switch is connected in ground with the load by a capacitor, or the control electrode of the fourth switch is connected with an input port of the mechanical switch by a capacitor.

18. The arc extinguishing apparatus according to claim 17, wherein the control unit adjusts a charging voltage for the first capacitor according to a current passing through the mechanical switch.

19. The arc extinguishing apparatus according to claim 17, further comprising a sixth switch, a third capacitor, and a fifth switch, wherein a control signal for the sixth switch is provided by the control unit; the third switch, the third capacitor, the fifth switch, and the second switch form a fifth series circuit, and the fifth series circuit is configured to charge the third capacitor; the sixth switch, the third capacitor, and the fourth switch form a sixth series circuit; the second power supply supplies power to the load by the sixth series circuit during the disconnection of the mechanical switch.

20. The arc extinguishing apparatus according to claim 17, further comprising an eighth switch and a sixth element, wherein a power supply at the input port of the mechanical switch is connected with a common node of the eighth switch and the fourth switch by the sixth element, and a voltage signal at the common node is transmitted to the control unit.

21. A method for arc extinguishing of a mechanical switch using an arc extinguishing circuit comprising a first switch, a first charging unit comprising a second switch, a third switch, and a first capacitor, the mechanical switch connected in series with a load to form a first series circuit, and the second switch, the third switch, and the first capacitor form a third series circuit, the method comprising:
charging, using a first power supply by the first charging unit and provided by a power supply connected to the first series circuit and the third series circuit, the first capacitor before a disconnection of the mechanical switch; and
during the disconnection of the mechanical switch, supplying, using a second power supply, power to the load by the first switch and the first capacitor.

* * * * *